Nov. 17, 1942. L. L. BERRY 2,302,595
AMMUNITION BELTS FOR MACHINE GUNS
Filed March 10, 1941

INVENTOR
Leland L. Berry
BY
ATTORNEYS

Patented Nov. 17, 1942

2,302,595

UNITED STATES PATENT OFFICE 2,302,595

AMMUNITION BELT FOR MACHINE GUNS

Leland L. Berry, Erie, Pa., assignor to Erie Resistor Corporation, Erie, Pa., a corporation of Pennsylvania Application March 10, 1941, Serial No. 382,518

6 Claims. (Cl. 89—35)

This invention is intended to improve ammunition belts for machine guns and particularly the link structure of such belts. Such devices as commonly made have metal spring clips for yieldingly securing cartridges in the belts and also for connecting one link with another.

In the present invention the links are made with the rings forming complete annuli and instead of being formed in the usual manner from metal stampings are formed of cast plastic material. The general form of the links and arrangement of the rings is as commonly used, namely, the body and neck rings for receiving the cartridge are joined by a connecting ring designed to form the connection in the belt with the next adjacent link. The cartridge receiving rings have inwardly extending projections which engage the surfaces of the cartridge, these projections being spaced so that the resilience of the intervening walls will permit the outward yielding of the projection through the inward flexing of the intervening walls. This construction, utilizing plastic material in its formation, assures very definite uniformity of the parts of the links, yieldable in so far as twisting is concerned and at the same time a very definite maintenance of the ring centers, thus assuring uniform registry with the gun parts. The plastic material used may be comparatively light and this is of advantage under certain conditions. Features and details of the invention will appear from the specification and claims.

Figure 1:
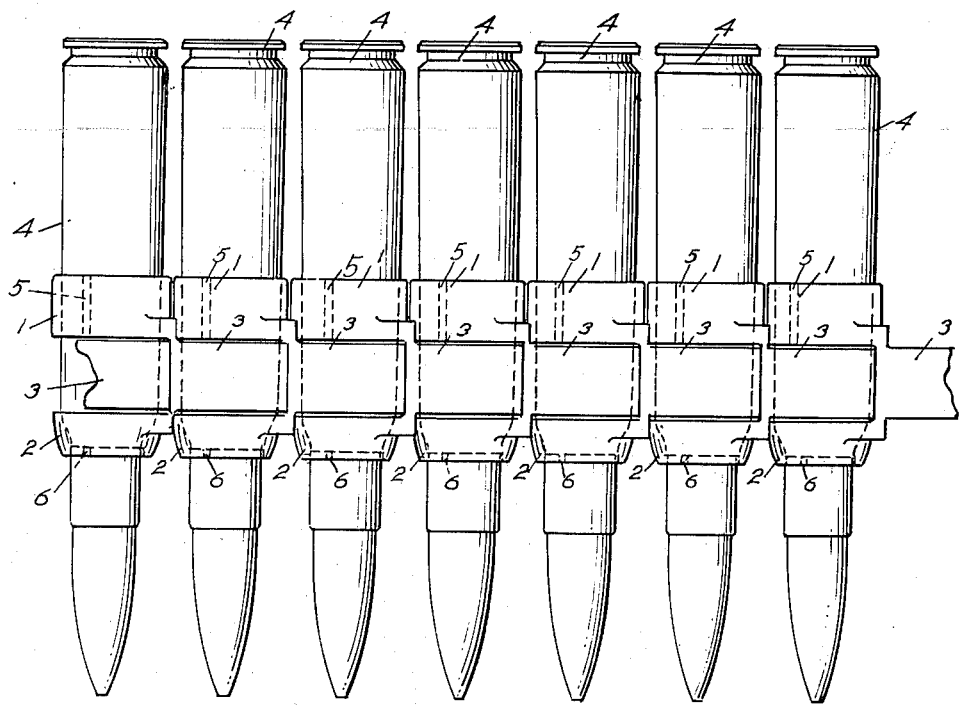

A preferred embodiment of the invention is illustrated in the accompanying drawing as follows:

Fig. 1 shows a front elevation of a belt formed in accordance with the invention and loaded with cartridges.

Figure 2:
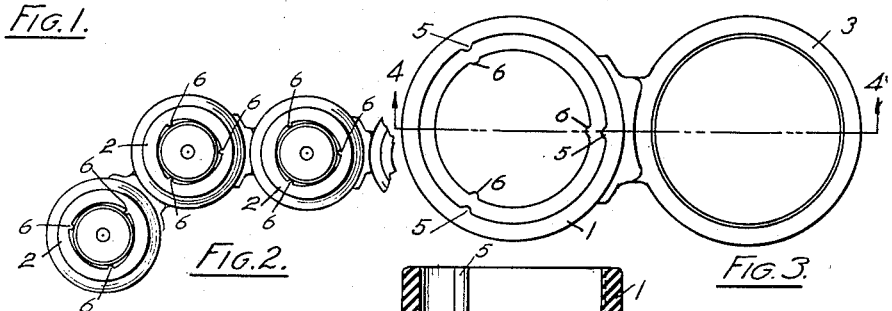

Fig. 2 an end elevation of a fragment of the belt.

Figure 3:
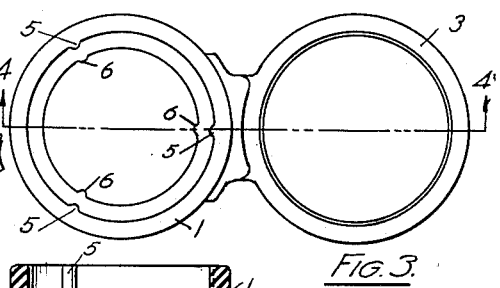

Fig. 3 an enlarged view of a link.

Figure 4:
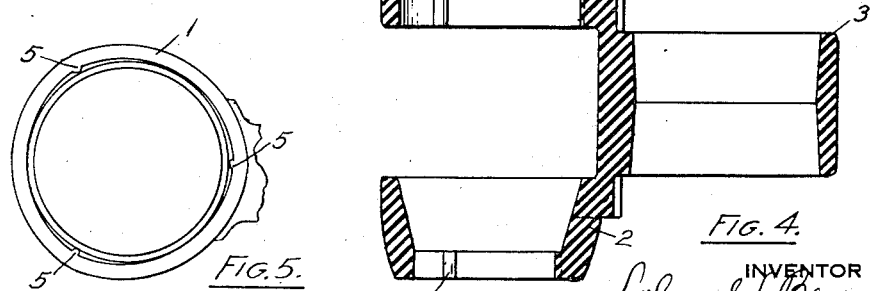

Fig. 4 a section on the line 4—4 in Fig. 3.

Figure 5:
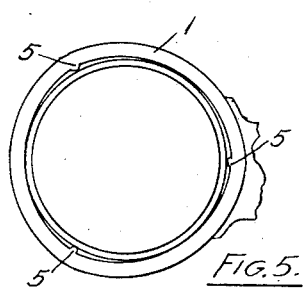

Fig. 5 an enlarged end view of a body ring forming a part of a link.

1 marks a body ring of a link, adapted to receive the body of a cartridge, 2 a neck ring of a link adapted to receive the neck of a cartridge, these rings being in axial alignment and spaced apart, 3 a connecting link offset and joining the body and neck rings, the connecting link being adapted to enter the space between the body and neck rings of the next adjoining link in a belt. Cartridges 4 are extended through the rings 1 and 2, the neck ring 2 being adapted to conform to the neck of the cartridge and the body ring 1 being adapted to receive the body of the cartridge.

The body ring 1 is provided with projections in the form of ribs 5 on its inner surface and the ring 2 may also be provided with projections in the form of ribs 6. These ribs project inwardly to a position slightly within the dimension of a cartridge so that as the cartridge is forced into place in the ring the walls of the rings are flexed outwardly at the projections and inwardly between the projections as shown in Fig. 5. The amount of flexing and the resilience of the material may be controlled to give exactly the right holding resistance to the cartridge and the tolerances may be so closely held that this resistance is maintained with great uniformity.

The resilience of the material forming the rings permits of the twisting of the belt without undue binding and the closed rings forming the belt maintain the centers between the links within close limits thus affording uniform registry with the parts of the gun even under all conditions of traction, with a consequent less tendency to jamming.

The use of plastic material in the forming of the links, such as cellulose acetate, which may be molded with great rapidity, has the necessary resilience to permit the distortion of the complete annulus in receiving the cartridge. At the same time this manner of forming the rings assures great uniformity, and this with the quality of the material assures smoothness in the passing of one layer over another in the box and in passing through the gun. This smoothness also reduces the wear and permits the use of greater choice of material in the feed and ejection chutes. The comparative lightness of the plastic material is also of advantage under certain conditions as for instance in airplanes where the discharged clips are apt to injure any parts that may be hit. The reduced weight is also of advantage where such weight is of consequence.

Difficulty has been experienced in the use of metal clips in the union of the clips with the cartridges through electrolysis or corrosion. With the present links this tendency is entirely avoided so that the loaded belt may be stored indefinitely.

What I claim as new is:

1. A link for ammunition belts for machine guns in which cartridges of definite diameter form the pintles of the belt and are adapted to be ejected for the disintegration of the belt as firing progresses, said link comprising a continuous annular cartridge receiving ring of resilient material having inwardly extending projections on its inner periphery for engaging an inserted cartridge, the inner surfaces of the projections extending inwardly to a point whose radius from the center of the ring is less than the radius of the exterior surface of the cartridge to be inserted, said projections being spaced circumferentially to permit the outward yielding of the projections for the reception of the cartridge in the ring through the resilience and distortion of the wall of the ring intervening between the projections whereby the ring yieldingly receives and releasably grips the inserted cartridge for operation in a belt of associated links and permits the normal ejection of the cartridge.

2. A link for ammunition belts for machine guns in which cartridges of definite diameter form the pintles of the belt and are adapted to be ejected for the disintegration of the belt as firing progresses, said link comprising a continuous annular cartridge receiving ring of resilient material having inwardly extending projections on its inner periphery for engaging an inserted cartridge, the inner surfaces of the projections extending inwardly to a point whose radius from the center of the ring is less than the radius of the exterior surface of the cartridge to be inserted, said projections being spaced circumferentially to permit the outward yielding of the projections for the reception of the cartridge in the ring through the resilience and distortion of the wall of the ring intervening between the projections whereby the ring yieldingly receives and releasably grips the inserted cartridge for operation in a belt of associated links and permits the normal ejection of the cartridge, said link being formed of cast plastic material.

3. A link for ammunition belts for machine guns in which cartridges of definite diameter form the pintles of the belt and are adapted to be ejected for the disintegration of the belt as firing progresses, said link comprising two continuous annular cartridge receiving rings of resilient material in axial alignment, an offset continuous annular ring joining the two alined rings and having an axis parallel thereto and providing a connecting means to a similar succeeding link, said rings being formed of resilient material and at least one of the rings having inwardly extending projections on its inner periphery for engaging an inserted cartridge, the inner surfaces of the projections extending inwardly to a point whose radius from the center of the ring is less than the radius of the exterior surface of the cartridge to be inserted, said projections being spaced circumferentially to permit the outward yielding of the projections for the reception of the cartridge in the ring through the resilience and distortion of the wall of the ring intervening between the projections whereby the ring having the projections yieldingly receives and releasably grips the inserted cartridge for operation in a belt of associated links and permits the normal ejection of the cartridge.

4. A link for ammunition belts for machine guns in which cartridges of definite diameter form the pintles of the belt and are adapted to be ejected for the disintegration of the belt as firing progresses, said link comprising two continuous annular cartridge receiving rings of resilient material in axial alignment, an offset continuous annular ring joining the two alined rings and having an axis parallel thereto and providing a connecting means to a similar succeeding link, said rings being formed of resilient material and at least one of the rings having inwardly extending projections on its inner periphery for engaging an inserted cartridge, the inner surfaces of the projections extending inwardly to a point whose radius from the center of the ring is less than the radius of the exterior surface of the cartridge to be inserted, said projections being spaced circumferentially to permit the outward yielding of the projections for the reception of the cartridge in the ring through the resilience and distortion of the wall of the ring intervening between the projections whereby the ring having the projections yieldingly receives and releasably grips the inserted cartridge for operation in a belt of associated links and permits the normal ejection of the cartridge, said link being formed of cast plastic material.

5. A link for ammunition belts for machine guns in which cartridges of definite diameter form the pintles of the belt and are adapted to be ejected for the disintegration of the belt as firing progresses, said link comprising two continuous annular cartridge receiving rings of resilient material in axial alignment, an offset continuous annular ring joining the two alined rings and having an axis parallel thereto and providing a connecting means to a similar succeeding link, said rings being formed of resilient material and the alined rings having inwardly extending projections on their inner peripheries for engaging an inserted cartridge, the inner surfaces of the projections extending inwardly to a point whose radius from the center of the ring is less than the radius of the exterior surface of the cartridge to be inserted, said projections being spaced circumferentially to permit the outward yielding of the projections for the reception of the cartridge in the ring through the resilience and distortion of the wall of the ring intervening between the projections whereby the ring having the projections yieldingly receives and releasably grips the inserted cartridge for operation in a belt of associated links and permits the normal ejection of the cartridge.

6. A link for ammunition belts for machine guns in which cartridges of definite diameter form the pintles of the belt and are adapted to be ejected for the disintegration of the belt as firing progresses, said link comprising two continuous annular cartridge receiving rings of resilient material in axial alignment, an offset continuous annular ring joining the two alined rings and having an axis parallel thereto and providing a connecting means to a similar succeeding link, said rings being formed of resilient material and the alined rings having inwardly extending projections on their inner peripheries for engaging an inserted cartridge, the inner surfaces of the projections extending inwardly to a point whose radius from the center of the ring is less than the radius of the exterior surface of the cartridge to be inserted, said projections being spaced circumferentially to permit the outward yielding of the projections for the reception of the cartridge in the ring through the resilience and distortion of the wall of the ring intervening between the projections whereby the ring having the projections yieldingly receives and releasably grips the inserted cartridge for operation in a belt of associated links and permits the normal ejection of the cartridge, said link being formed of cast plastic material.

LELAND L. BERRY.